United States Patent [19]

Dierkes

[11] 4,257,544
[45] Mar. 24, 1981

[54] DETACHABLE MOTORCYCLE RACK

[76] Inventor: Barry Dierkes, 3962 Cedar, Long Beach, Calif. 90807

[21] Appl. No.: 37,430

[22] Filed: May 9, 1979

[51] Int. Cl.³ .............................................. B62J 7/04
[52] U.S. Cl. ................................. 224/32 A; 224/39; 248/553
[58] Field of Search ............... 224/30 R, 32 A, 32 R, 224/30 A, 33 R, 33 A, 35, 36, 39, 40, 41, 42.25, 42.43, 42.44, 42.46 R; 248/553, 551, 552; 70/58, 233, 34, 62

[56] References Cited

U.S. PATENT DOCUMENTS

| | | | |
|---|---|---|---|
| 1,709,239 | 4/1929 | ver Wiebe | 248/553 |
| 2,531,902 | 11/1950 | Baron | 224/32 A |
| 2,771,305 | 11/1956 | Buegeleisen | 224/32 A X |
| 3,662,979 | 5/1972 | Lucci | 248/553 |
| 3,795,354 | 3/1974 | Stippich | 224/32 A |

FOREIGN PATENT DOCUMENTS 63797  7/1945  Denmark ............................... 224/32 A
168511  9/1959  Sweden .................................. 224/32 A Primary Examiner—David A. Scherbel
Assistant Examiner—Jerold M. Forsberg
Attorney, Agent, or Firm—I. Michael Bak-Boychuk

[57] ABSTRACT

Set out herein is a detachable motorcycle rack assembly which by way of an attachment fixture may be mounted on various motorcycles. The attachment fixture itself includes a strap or a bar provided with a mounting block which includes an offset tab having a longitudinal slot formed therein terminating in an enlarged opening. The rack, in turn, includes a lock having a rotatable insert of elongate section, the section being dimensioned to pass through the slot at one angular alignment thereof and to oppose withdrawal from a slot in a second angular alignment thereof. In this manner the rack may be mounted or demounted from the motorcycle by the simple turning of a key in a structure which is rugged and adapted for motorcycle use.

2 Claims, 7 Drawing Figures

U.S. Patent  Mar. 24, 1981  4,257,544
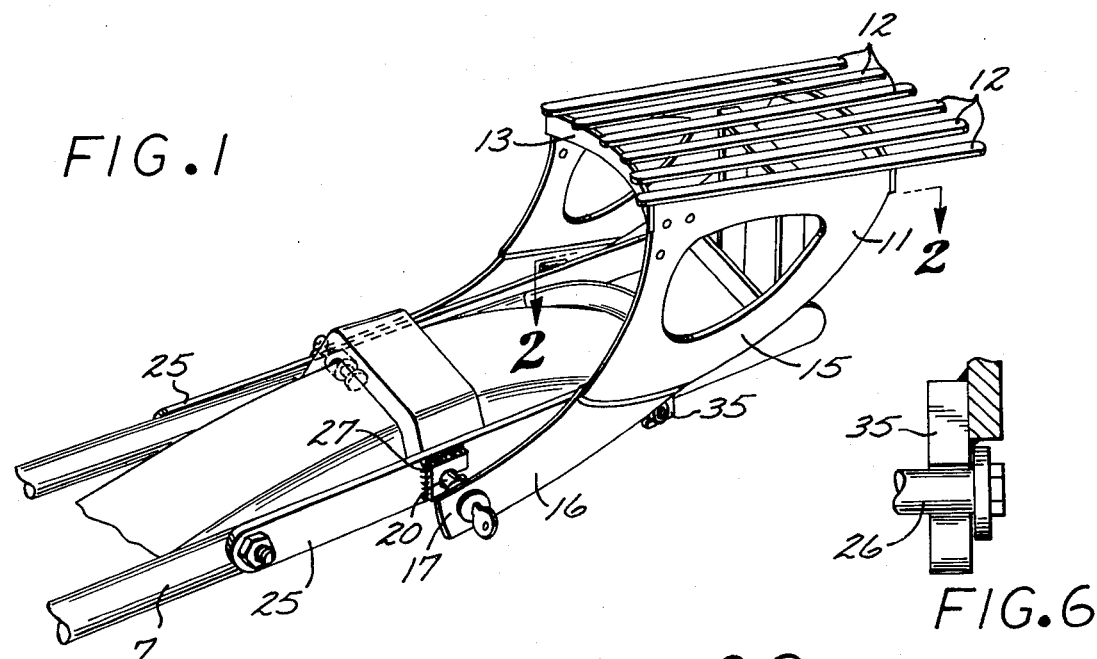
FIG. 1
FIG. 6
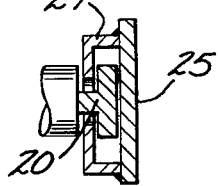
FIG. 5
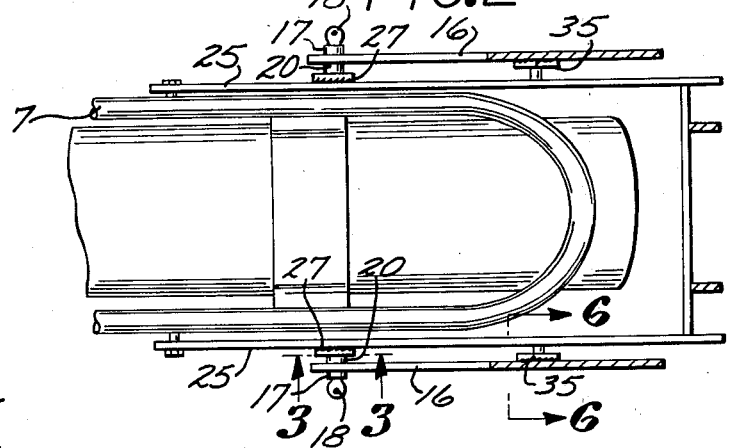
FIG. 2
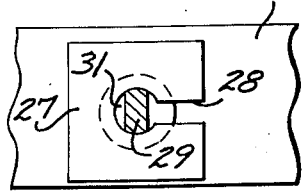
FIG. 3
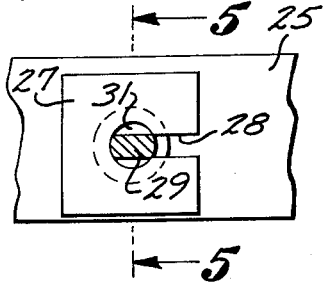
FIG. 4
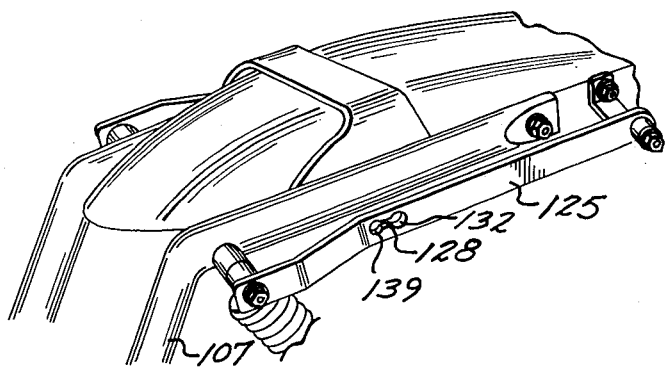
FIG. 7

DETACHABLE MOTORCYCLE RACK

BACKGROUND OF THE INVENTION

1. Field of the Invention

The present invention relates to attachment fixtures, and more particularly to attachments for mounting motorcycle racks in a releasable fashion.

2. Description of the Prior Art

Racks for storing or supporting items on the rear of a motorcycle have been known in the past. Most frequently such racks are attached to the motorcycle with various fastening devices and because of the complexity of the attachment structure become a permanent fixture thereon. With the recent styling chnges in motorcycle appearance such permanent fixing of a rack detracts therefrom and for that reason are not utilized. The motorcycle then becomes of less utility rendering any transportation of articles more difficult. For these and many other reasons the installation of a removable rack have had extensive demand in the marketplace. Such installation, in order to be of advantage, must possess the simplicity of structure and the convenience in mounting and demounting that are necessary in the rugged use that a motorcycle is put to and are of sufficient convenience for market success.

SUMMARY OF THE INVENTION

Accordingly, it is the general purpose and object of the present invention to provide a demountable motorcycle rack which by virtue of its features is easily manipulated and which is fixed in position by the simple turning of a key.

Other objects of the invention are to provide a motorcycle rack tied to the motorcycle by a rugged key structure which is not prone to inadvertent failure.

Further objects of the invention are to provide a key engaged removable motorcycle rack wherein the key structure provides a rigid connection to the motorcycle when engaged.

Briefly these and other objects are accomplished within the present invention by providing a sub frame formed in the manner of metal straps which may be tied permanently to the motorcycle structure. The sub frame may include two symmetrically disposed tabs each including a horizontal slot partly extending therethrough, the slots terminating in an enlarged circular opening. Included further on the sub frame are additional rack mounts onto which a rack may be placed. Thus a removable rack provided with slotted brackets conformed to engage the mount and with flat sided key assemblies adapted to pass through the slot in the mounting tabs may be conveniently placed and upon rotation of the flat sided pins may be fixed to the motorcycle. By virtue of this arrangement of parts, engagement with the mount fixes the rack both vertically and against withdrawal while the flat sided key assembly fix the rack to the sub frame. Thus a very simple structural engagement is achieved which in all of its features has the necessary structural strength for the rugged use normally entailed.

BRIEF DESCRIPTION OF THE DRAWINGS

FIG. 1 is a perspective illustration of a motorcycle rack assembly constructed according to the present invention;

FIG. 2 is a plan view, in partial section, taken along line 2—2 of FIG. 1;

FIG. 3 is a detail view of a locking arrangement useful with the invention herein;

FIG. 4 is another view of the lock shown in FIG. 3, illustrating the withdrawal alignment thereof;

FIG. 5 is a sectional view of the locking arrangement useful herein;

FIG. 6 is a detail view of a mount useful herein; and

FIG. 7 is an alternative implementation, in perspective, of a subframe useful herein.

DESCRIPTION OF THE SPECIFIC EMBODIMENT

As shown in FIGS. 1-4, the inventive removable rack assembly, generally designated by the numeral 10, comprises a removable rack 11 having a plurality of slats 12 fixed to two support rails 13 which in turn are attached to two side plate assemblies 15. Side plate assemblies are substantially triangular in plan form tapering from an edge disposed adjacent the distal most slats 12 to an apex to attach thereat to two extension bars 16. Extension bars 16, proximate their free ends, each include a key tumbler 17 which upon insertion of an appropriate key 18 will rotate an inwardly directed flat sided pin 20. Pins 20 at their inwardly directed free ends terminate in enlarged discs for ease of alignment.

The foregoing assembly may be fixed to a motorcycle frame M by way of a sub frame 25 comprising longitudinally extending straps disposed on either side of the vehicle. It is to be understood that the lateral spacing between the straps approximate the gap between the interior ends of the flat sided pins 20 to allow the advancement of the rack 11 therealong. Each strap is provided with a mounting tab 27 extending outwardly from the sub frame 25 on either side of the motorcycle. Tabs 27 each includes a slot 28 extending horizontally through a portion thereof, slots 28 being directed from the rear to the front of the motorcycle. At the front interior terminus of slots 28 there is formed a circular opening 31 in each of the tabs 27 which in its radial dimensions is conformed to receive the larger dimensions of the pins 20. The slots 28, furthermore, are dimensioned to allow the passage of the pins therethrough when aligned horizontally. More specifically, as shown in FIGS. 3-6 each pin 20 is substantially cylindrical in section having two opposed slats which reduce the sectional size thereof to a rectangular section 29 conformed for translation through slots 28. Upon abutting the edges of the circular opening 31 the pins 20 may be rotated by way of keys 18 to an alignment where the larger sectional dimension thereof precudes withdrawal. The use of a key to accomplish this function effectively locks the end of the straps 17 to the sub frame tabs thus securing the rack. When removal is sought, all that is required is the unlocking of each of the tumblers to align the pins 20 for passage through the slots 28, there being no additional operations necessary.

In the alternative, as shown in FIG. 7 a sub frame 125 similarly constructed out of metal straps includes a slot 128 having enlarged openings 129 and 132 at either ends thereof, opening 139 at the front being conformed similar to opening 31 for rotation of the pin 20 therein while opening 132 is sized to pass the end cap. Thus the sides of the rack 11 may be flexed outwardly until the pins align with openings 132 and then released. The same frame assembly may then be advanced forwardly and the pins rotated to complete the attachment.

The foregoing structural connection may be variously complemented with other sliding engagements thus facilitating mounting and demounting. More specifically, the slide plates 15 of the rack assembly 11 may include positioning tabs 35 being similarly directed to receive correspondingly dimensioned posts 26 extending from the sub frame 25. Thus, a single horizontal advancement of the rack 11 onto the sub frame 25 wll align concurrently both the pins 20 in their respective slots and the rear posts in the rear mount provisions. The rack is thus fastened against horizontal and vertical loads by the camming rotation of the pins and is thus fixed with sufficient rigidity to endure the loads entailed in use of motorcycles.

To provide for the requisite structural stiffness, the side plates 15 and the other rack structure may be made of thick aluminum plate, polished for appearance, and heliarc welded where necessary. The slats 12 themselves may be variously conformed, it being intended to use either wood or metal for enhanced appearance.

When not in use, the rack may be dismounted and the remaining structure of the sub frame left attached to the motorcycle. The strap-like configuration of the sub frame 25 presents a very inconspicuous visual appearance when aligned with the motorcycle frame members M and particularly when placed subjacent the seat edges normally found.

Obviously many modifications and changes can be made to the foregoing description without departing from the spirit of the invention. It is therefore intended that the scope of the invention be determined solely on the claims appended hereto.

What is claimed is:

1. In a motorcycle having a seat supported by a frame the improvement comprising:

a subframe attached to said frame including longitudinal straps mounted along the longitudinal edges of said seat each such strap including a longitudinal slot terminating in a circular opening, said subframe includes mounting means attached thereto; and a rack assembly having two opposed side frames combining to form a U-shaped structure together with a rack, said U-shaped structure being conformed to receive in supporting relationship said subframe on the interior thereof, each said side frame including a key assembly proximate the end thereof connected to rotate a pin having a smaller sectional dimension adapted to pass through said slot and a larger dimension conformed for receipt in said opening, said key assemblies being aligned to direct said pins towards each other, said rack assembly includes attachment means adapted to engage said mounting means during the course of translation of said pin along said slot, whereby said rack assembly may be slid onto said subframe and in the course of the sliding translation said pins engage said slots and said mounting means engage said attachment means.

2. Apparatus according to claim 1 wherein:

said pins each include end plates at the free ends thereof of plan dimensions larger than said opening.

* * * * *